May 17, 1938.   J. W. HOEFLING   2,117,805
PROPORTIONAL FEEDER
Filed Jan. 21, 1936   2 Sheets-Sheet 1
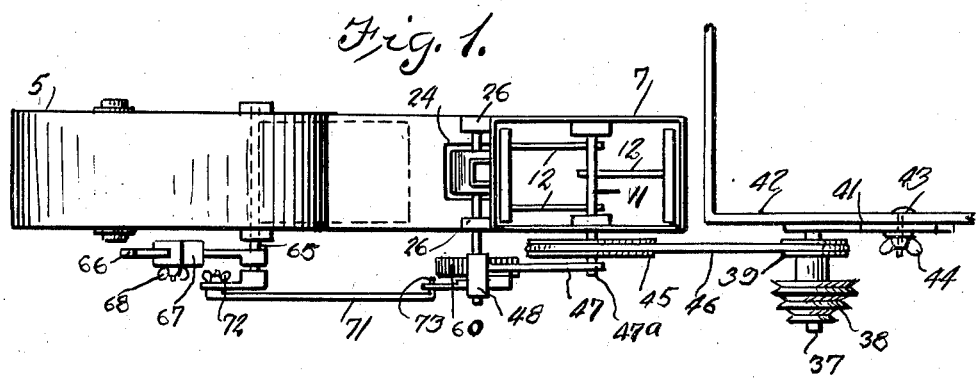
Fig. 1.
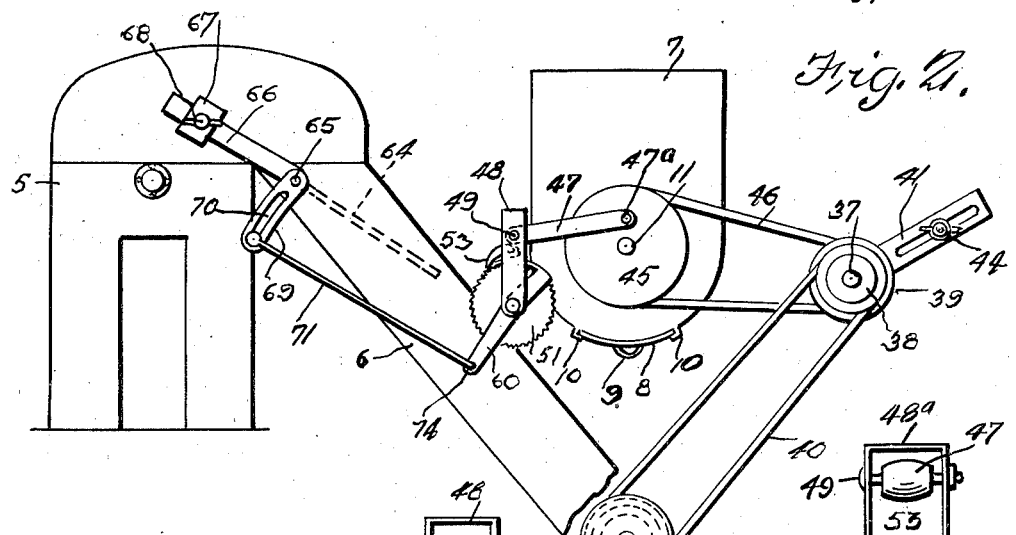
Fig. 2.
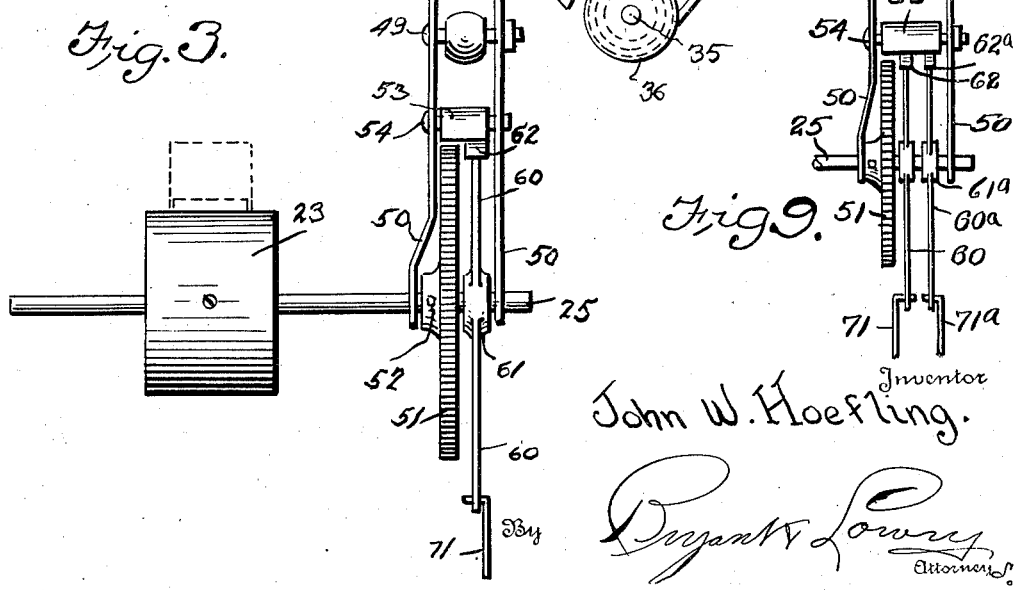
Fig. 3.
Fig. 9.
Inventor
John W. Hoefling.
By Bryant & Lowry
Attorneys

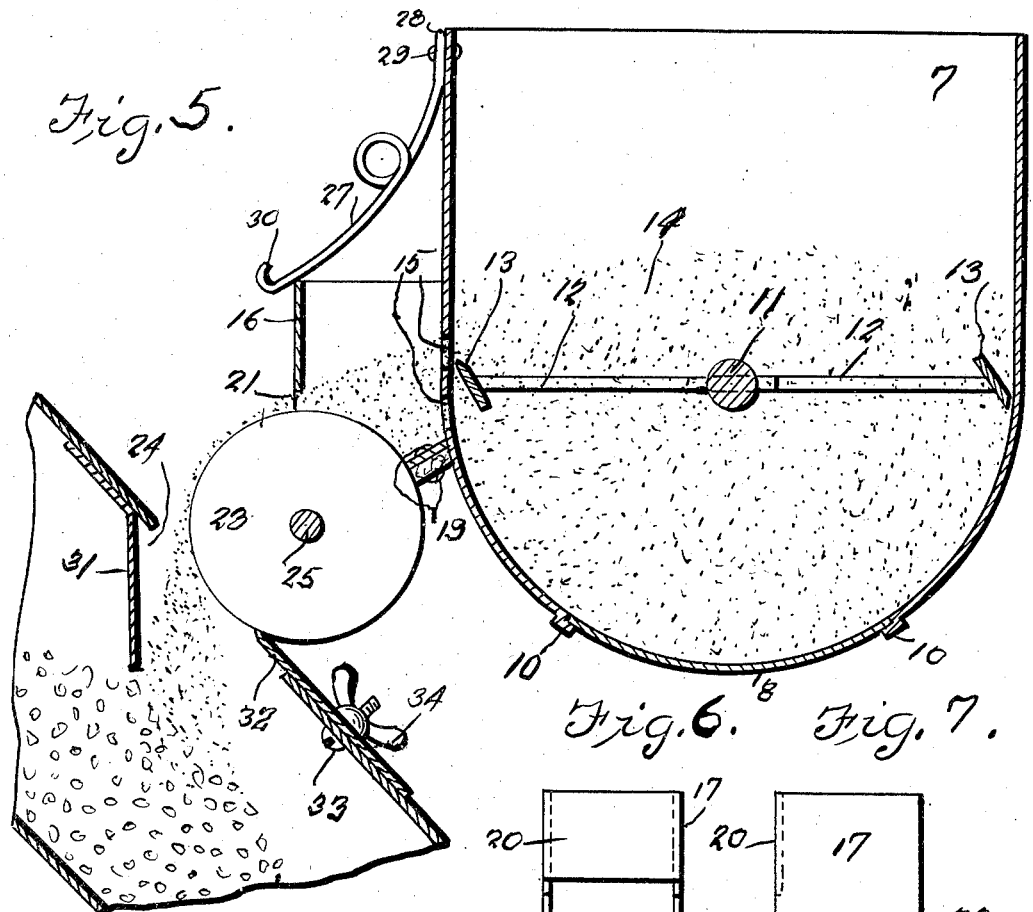
Fig. 5. Fig. 6. Fig. 7.
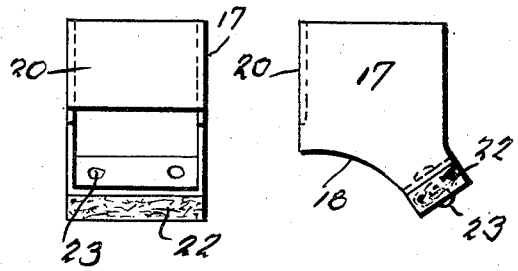
Fig. 4. Fig. 8.
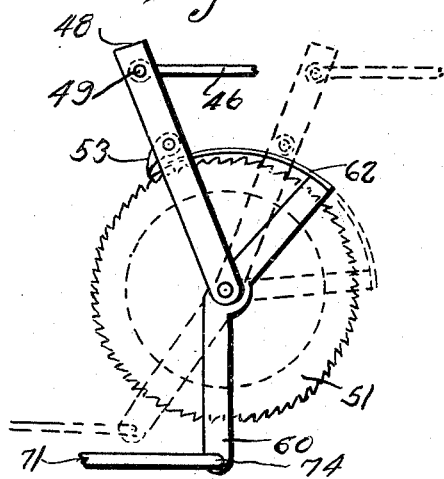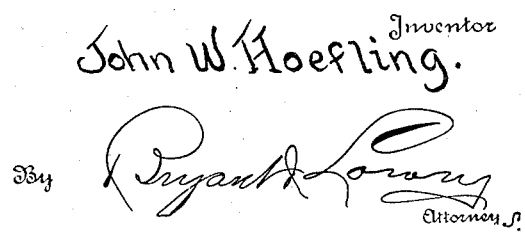
John W. Hoefling, Inventor Patented May 17, 1938

2,117,805

UNITED STATES PATENT OFFICE 2,117,805

PROPORTIONAL FEEDER

John W. Hoefling, Sacramento, Calif., assignor to Hoefling Bros., Inc., Sacramento, Calif.

Application January 21, 1936, Serial No. 60,116

1 Claim.  (Cl. 83—44)

This invention relates to an improved automatic feeder for accurately metering small quantities of disinfectant powders such as copper carbonate or Ceresan in the treatment of seed grains and "Novadel" or similar conditions used in flour milling, talcum in rice polishing, etc.

In these industries it is the usual practice to distribute predetermined amounts or quantities of the treating material to a stream of passing grain.

Heretofore, this practice has been carried on by applying a constant quantity of powder or conditioning material to the grain, presuming an even stream flow of grain to effect the desired ratio of application. However, such practice naturally results in an undesirable unequal ratio of conditioning material where there is any fluctuation in the grain stream.

The present invention overcomes the above difficulties and disadvantages by dispensing predetermined amounts of the treating medium to the grain stream in accordance with the volume of the grain, so that a fixed ratio of powder and grain will be maintained at all times.

The primary object of this invention is to supply a predetermined ratio of grain conditioning material to the grain stream, by a feed metering device governed by weight or volume of the grain stream passing below the dispenser.

A further object of this invention is to provide a two stage powder dispenser thus providing a positive and uniform feeding of the finely divided powders used therein, regardless of the level of the powder in the feeder hopper, of humidity, or other changing conditions.

A further object is to provide a powder dispenser adaptable to remote manual control, either alone or in combination with automatic control.

A further object of this invention is to provide a compact powder dispenser in which the discharge is mechanically controlled, thereby eliminating the error of the human element.

Other objects and advantages of the invention will become apparent during the course of the following description and with reference to the accompanying drawings, the description and illustrations herewith showing the powder dispenser located immediately above the discharge spout of a grain elevator.

Figure 1 is a top elevational view of the invention illustrating the grain elevator head and discharge spouts and showing the position of the feed mechanism in relation thereto;

Figure 2 is a side elevational view of the same subject as of Figure 1;

Figure 3 is a fragmentary enlarged view of the final dispensing roll and the drive mechanism for imparting intermittent rotation thereto;

Figure 4 is a side elevational view showing the drive mechanism for the discharge roll greatly enlarged and illustrating the pawl controlling segment, the movement of which is controlled by the volume of the grain stream;

Figure 5 is a greatly enlarged view showing the powder receptacle in cross-section and illustrating the 2 stage discharge of the conditioning material through a secondary chamber;

Figure 6 is a front elevational view of the secondary dispensing chamber illustrating a portion of its open front wall;

Figure 7 is a side elevational view of the same chamber showing the general contour thereof;

Figure 8 is a top elevational view of the dispensing chamber; and

Figure 9 is an enlarged fragmentary view similar to Figure 3, and showing both automatic and manual controls of the intermittent movement to the dispensing roll.

In the drawings wherein for the purpose of illustrating the invention and wherein like reference characters are used to designate the same parts throughout, the reference character 5 refers to the conventional cup type grain elevator, and the character 6 refers to the elevator discharge spout.

The invention comprises a hopper 7, located above the discharge chute 6, said hopper 7 being provided with clean-out slide 8 having a handle 9 attached thereto. The slide 8 is retained by guides 10 formed on the bottom wall of the hopper 7.

Rotatably mounted within the hopper 7 is an agitator including a rotary shaft 11 having the ends journalled in the side walls of the hopper, the shaft being provided with arms 12 on the outer ends of which are attached agitating blades 13 adapted to agitate the material in the hopper 7. The agitator blades 13 are further adapted to act as primary feeders of the treating material 14 through fixed size openings 15 located in the side wall of the hopper opposite the agitator shaft 11.

Presented to the primary discharge openings 15 is the secondary feed chamber 16 more clearly shown in Figs. 6 to 8 inclusive, this chamber comprising side walls 17 having arcuately curved portions 18, a bottom wall 19 and a front wall 20. It is to be noted that the front wall 20 does not extend to the lower edge or arcuately curved side portions 18, thus forming the secondary or fixed discharge opening 21 when the chamber 16 is in position as shown in Figure 5 so that the rear edges of the side walls 17 engage the hopper 7 and the arcuately curved portions 18 of the side walls 17 engage the feed roll which will be more fully described later. Provided on the lower wall 19 of the chamber 16 is a felt packing member 22 held in place by rivets or the like as at 23. The packing member 22 is adapted to engage the periphery of the feed roll and also the curved contour of the hopper 7.

The feed roll 23 is located directly above an opening 24 in the top of chute 6 and this roll 23 is mounted on a shaft 25 having its ends mounted in journal bearings 26 secured to the hopper 7 so that the whole assembly is self-contained thus simplifying installation and always maintaining the proper relative position of coordinated parts.

It is to be understood that this final feed chamber 16 is arranged to float upon the feed roll 23 and against the side of hopper 7 and a spring arm 27 is provided for retaining this chamber in place as shown in Figure 5. One end of the spring 27 as at 28 is fastened to the hopper 7 as at 29 while the free end 30 engages the upper edge or wall 20 of chamber 16. In this manner this chamber is lightly pressed against the feed roll 23 and also against the curved contour of the dispensing hopper 7, forming substantially powder tight contacts with those two surfaces.

A splash guard 31 is located along the inside upper edge of opening 24 in the chute 6 to prevent splash of grain through opening 24. Directly opposite the guard 31 an adjustable doffer blade 32 to remove any powder adhering to roll is secured in place by a bolt 33 and wing nut 34.

The agitator shaft 11 is arranged to be driven at different speeds through the introduction of a pair of step pulleys 36 and 38 connected by belt 40. The driving step pulley 36 is fixed to any convenient shaft as 35, and the driven pulley 38 is carried on an idler shaft 37 fastened to and adjustable through plate 41, bolt 43 and wing nut 44, and pulley 39, which rotates as a unit with pulley 38, is in turn connected to the agitator shaft 45 by belt 46. This variable speed drive is the primary basis of the feed rate control as effected through the corresponding change of speed of the connected ratchet mechanism as depicted in Figures 1 and 2.

The feed roller 23 is adapted to be rotated by means of a pawl and ratchet drive including a connecting rod link 47 having one end secured to a crank pin 47a in pulley 45 while the opposite end is pivotally attached to a stirrup 48 as at 49. The lower ends 50 of the stirrup 48 are rotatably mounted upon the feed roll shaft 25 straddling the ratchet wheel 51 which is fixed to the feed roll shaft 25 by means of a set screw 52. Pawl 53 is pivotally secured between the legs 50 of the stirrup 48 by pin 54 so as to engage the ratchet wheel 51 and rotate the feed roll 23 in a step by step fashion.

The length of stroke of the stirrup 48 is constant, although, as explained above, its rate of movement is subject to change through the step pulley arrangement. However, means is provided for shortening or lengthening the effective stroke of the pawl 53 and includes a lever 60 pivotally secured to the feed roll shaft 25 as at 61 and formed on the upper end of this lever 60 is an arcuately curved segment 62 for lifting the pawl 53 and preventing contact thereof with the ratchet wheel 51. This ratchet control device is fully described and set forth in my concurrent application for Letters Patent, Serial No. 49,410, filed November 12, 1935 covering "Adjustable stroke pawl and ratchet". The movement of the lever 60 is controlled by the movement of the vane 64 pivoted in the upper portion of the spout 6 as at 65. An arm 66 is adjustably secured to the pivot point of the vane 64 and is provided with an adjustable counterbalance weight 67 secured by thumb screw 68.

Extending downwardly from the pivot point 65 and secured thereto is an adjustable arm 69 having a curved slot 70 to which is adjustably secured one end of the link 71 by means of a wing nut 72. The other end of the link 71 is angularly bent as at 73 to be received in an opening formed in the lower end of the lever 60 as at 74. The arc of curvature of the slot 70 is of a radius substantially equal to the length of the link 71, so that any adjustments of the link end along the slot will not affect the position of the lever 60.

The operation of the device is as follows: The pulley 45 on the agitator shaft 11 rotates at a constant rate of speed selective through the step pulley arrangement maintaining also a constant stroke of the stirrup 48 and the pawl 53 which it carries. The effective length of the pawl stroke, however, is governed by the rotative position of the segment 62 which keeps the pawl raised from engagement with ratchet wheel 51, whenever the said segment 62 enters the arc of travel of the pawl. Thus, when a maximum stream of grain is flowing through chute 6 and impinging on vane 64, the vane is depressed to its lowermost position thereby actuating segment 62 so that it is withdrawn clear of any engagement with pawl 53, making the full stroke of the pawl effective in its engagement with the ratchet wheel. If, however, a variation in the stream flow occurs, the vane 64 reacts, by reason of its counterbalance by an upward movement in proportion to the degree of variation and brings the segment 62 into lifting contact with the pawl so that the length of its effective stroke is shortened in like proportion. An entire cessation of the grain flow thus effects a complete shut off of powder feed also as the segment 62 holds the pawl off the ratchet wheel throughout its stroke. Conversely, the effect of an increased grain flow again is immediately reflected through downward movement of vane 64 and consequent partial or total withdrawal of segment 62 from its contact with pawl.

Primary fixed feed ratios are determined and maintained by the speed changes provided for by the step pulley arrangement. However, any further intermediate feed ratios desired are available through the link adjustment in the slot 70 thereby changing the throw of the link 71 with always the ultimate result that the desired ratio of treating material to grain is maintained regardless of fluctuations in the grain stream volume.

If desired, as where there would be no grain stream variation the link 71 may be disconnected entirely from the automatic control element and set for any desired fixed position as through a hand lever and quadrant which can be simply arranged for remote control from any convenient point.

Furthermore, under certain conditions it is desirable to have both automatic and manual control of the powder feed. Such an arrangement is shown in Figure 9. Then a slightly wider stirrup 48a is used, permitting a wider pawl and the introduction of two independently acting control quadrants 60 and 60a, both of which act on the same pawl 53 as explained above. One of these quadrants as 60 is connected as usual through the link 71 to be controlled by the grain stream volume. The other quadrant 60a is for manual control through link 71a. Thus, while quadrant 60 is in normal automatic control of the feed, the feed may be started, stopped, or limited as desired, by remote manual control of quadrant 60a.

It is to be understood that the form of the invention herewith shown and described is to be taken as a preferred embodiment of the same and that various changes in the shape, size and arrangement of parts may be resorted to without departing from the spirit and scope of the invention as claimed.

I claim:—

The combination with an inclined discharge chute for primary material having an opening intermediate its ends, of a hopper containing secondary material located above said opening, a feed roll interposed between the hopper and the opening and forming at least a portion of the bottom of the hopper and mounted for rotation to convey the secondary material from the hopper to the opening, a doffer blade attached to the chute and in contact with the roll below the opening, means for rotating the roll in a step by step movement, a vane pivotally mounted in the discharge chute above the opening and normally closing the passage therethrough and capable of being variably positioned by variations in the flow thereover of primary material and means dependent on the position of the vane connecting the vane with the first mentioned means determining the extent of the step by step movement of the roll.

JOHN W. HOEFLING.